(12) United States Patent
Yamagishi

(10) Patent No.: US 8,428,190 B2
(45) Date of Patent: Apr. 23, 2013

(54) RADIO RECEIVING APPARATUS AND RADIO RECEIVING METHOD

(75) Inventor: Toshiyuki Yamagishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 446 days.

(21) Appl. No.: 12/719,948

(22) Filed: Mar. 9, 2010

(65) Prior Publication Data

US 2010/0238992 A1    Sep. 23, 2010

(30) Foreign Application Priority Data

Mar. 18, 2009    (JP) .................. 2009-066940

(51) Int. Cl.
*H04B 7/10* (2006.01)
*H04L 1/02* (2006.01)

(52) U.S. Cl.
USPC .......................................... 375/316; 375/347

(58) Field of Classification Search ........... 375/132, 375/260, 347, 232, 340
See application file for complete search history.

(56) References Cited

U.S. PATENT DOCUMENTS

| | | | |
|---|---|---|---|
| 6,198,781 B1 | 3/2001 | Ohno et al. | |
| 7,283,598 B2 | 10/2007 | Akita et al. | |
| 2004/0258171 A1* | 12/2004 | Akita et al. | 375/260 |
| 2006/0067444 A1* | 3/2006 | Hamamoto | 375/347 |

FOREIGN PATENT DOCUMENTS

| | | |
|---|---|---|
| JP | 10215235 | 8/1998 |
| JP | 2000286819 | 10/2000 |
| JP | 2001-069118 | 3/2001 |
| JP | 2001-086092 | 3/2001 |
| JP | 2001-237796 | 8/2001 |
| JP | 2002044049 | 2/2002 |
| JP | 2003-218828 | 7/2003 |
| JP | 2003309532 | 10/2003 |
| JP | 2004-159084 | 6/2004 |
| JP | 2004320738 | 11/2004 |
| JP | 2006-100888 | 4/2006 |

OTHER PUBLICATIONS

Japanese Office Action for Japanese Application No. 2009-066940 mailed on Aug. 2, 2011.

* cited by examiner

*Primary Examiner* — David C. Payne
*Assistant Examiner* — Wednel Cadeau
(74) *Attorney, Agent, or Firm* — Turocy & Watson, LLP

(57) ABSTRACT

In-phase channels and quadrature-phase channels of carrier waves are calculated from a reception signal obtained by receiving the multi-carrier signal. Transmission channel characteristics of the carrier waves are calculated from a known signal section of the reception signal. Transmission channel equalization processing for compensating for an amplitude change and phase rotation in the in-phase channels and the quadrature-phase channels caused by a transmission channel is performed. A region on a complex plane in which output data after transmission channel equalization is present is determined. An estimation value of a phase rotation angle used in performing the transmission channel equalization processing is corrected based on information concerning the determined region.

18 Claims, 8 Drawing Sheets

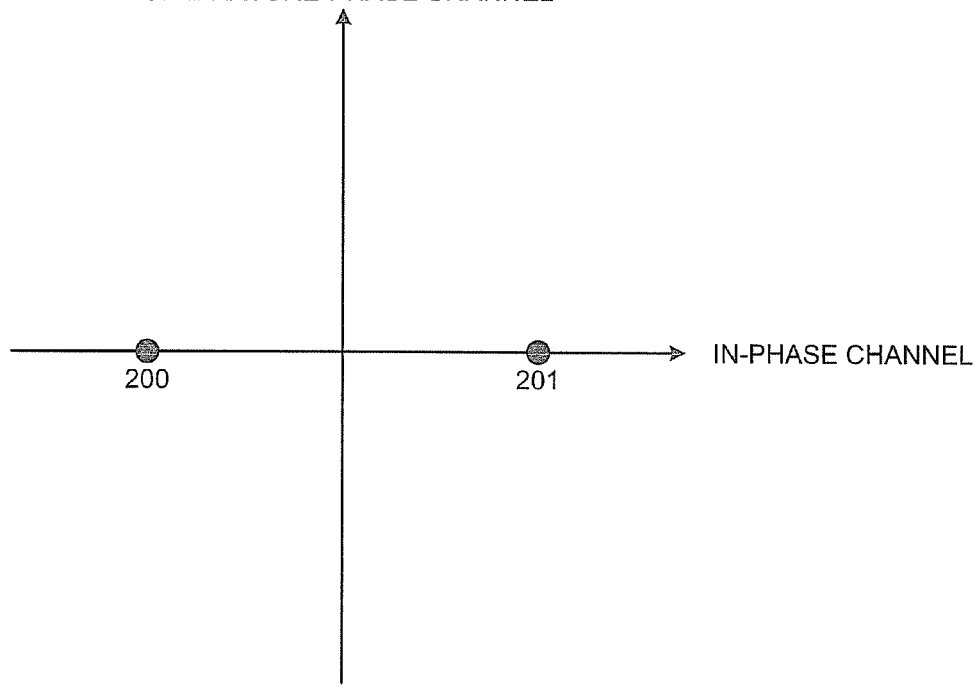
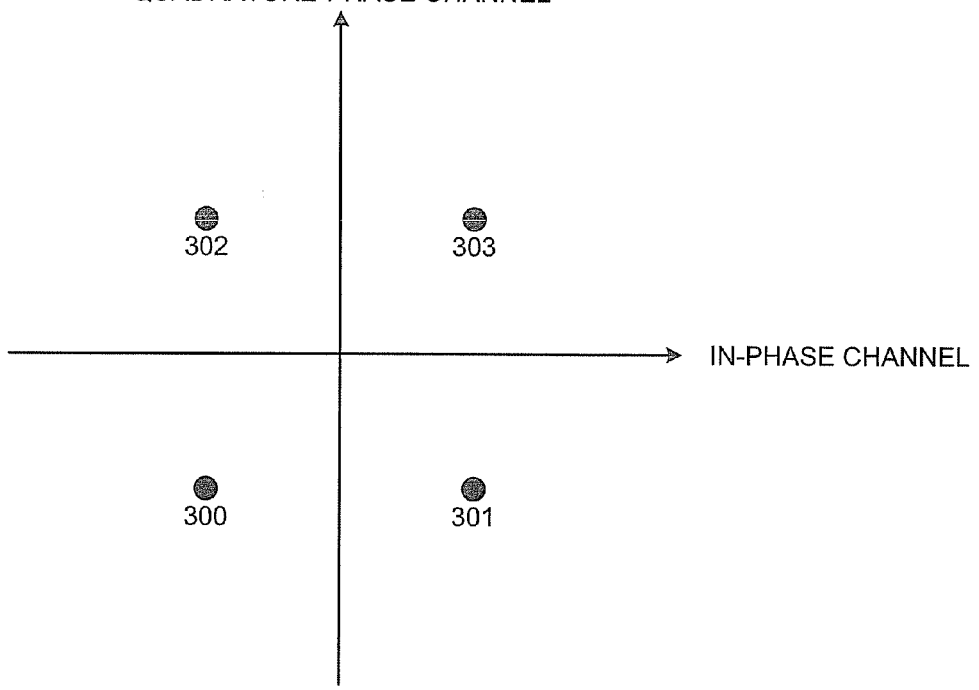

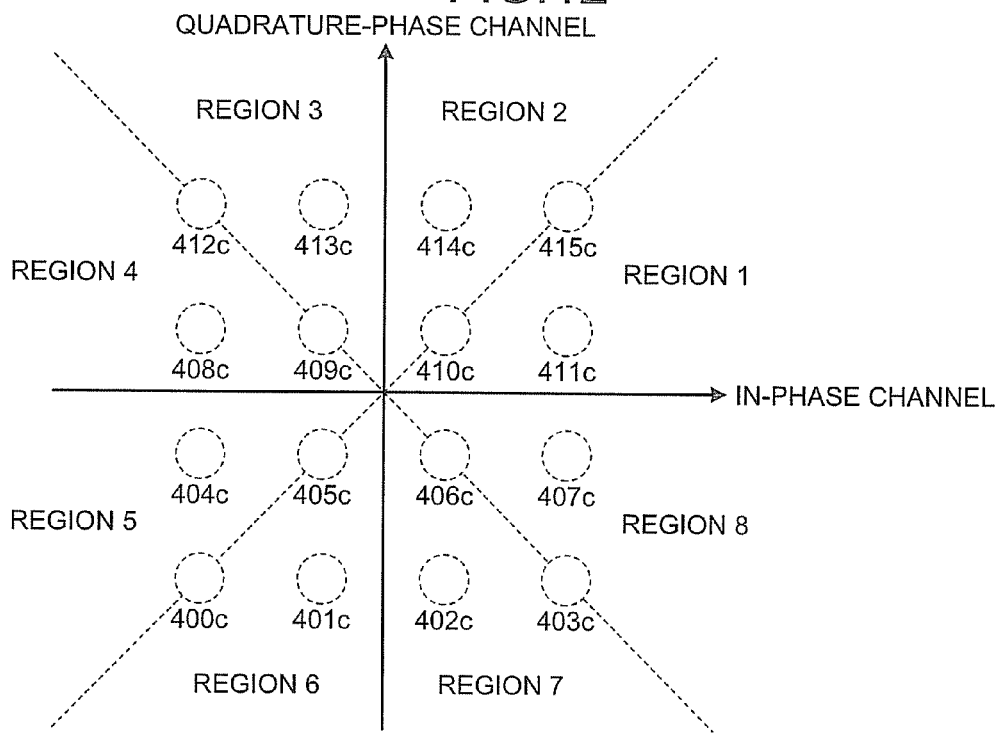
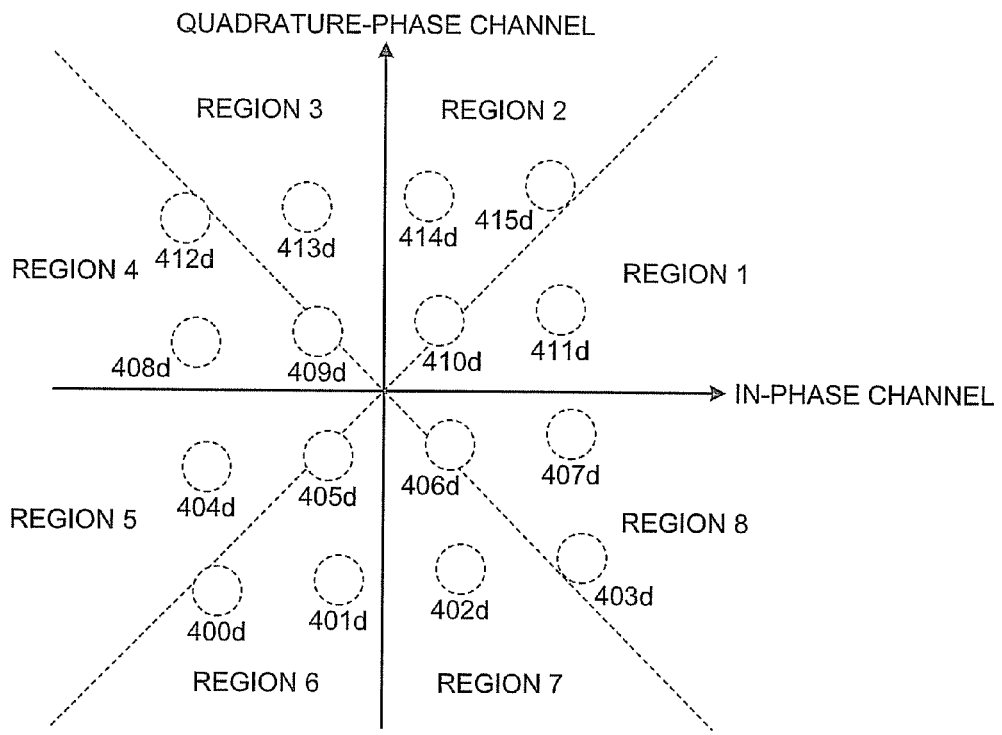

RADIO RECEIVING APPARATUS AND RADIO RECEIVING METHOD

CROSS-REFERENCE TO RELATED APPLICATIONS

This application is based upon and claims the benefit of priority from the prior Japanese Patent Application No. 2009-066940, filed on Mar. 18, 2009; the entire contents of which are incorporated herein by reference.

BACKGROUND OF THE INVENTION

1. Field of the Invention

The present invention relates to a radio receiving apparatus and a radio receiving method.

2. Description of the Related Art

When radio communication is performed, radio waves that reach from a transmission antenna to a reception antenna include, besides a direct wave that directly reaches from the transmission antenna, various indirect waves such as a reflected wave that reaches the reception antenna after reflecting on an object present around the transmission antenna. A receiver detects a signal of interference between the direct wave and the indirect waves. However, a form of the interference is different depending on a frequency of a radio wave and fluctuates with time according to the movement of the object present around the transmission antenna.

For example, in orthogonal frequency division multiplex (OFDM) (hereinafter, "OFDM communication") for performing signal transmission using a plurality of sub-carriers obtained by modulating a plurality of carrier waves orthogonal to one another, the interference by the direct wave and the indirect waves appears as shifts of the amplitudes and the phases of the carrier waves. The shifts of the amplitudes and the phases are referred to as transmission channel characteristics. For demodulation of an OFDM signal, it is necessary to estimate the transmission channel characteristics for the respective carrier waves.

On the other hand, usually, a known signal is present at the head of an OFDM packet. The receiver performs transmission channel estimation using the known signal and demodulates the remaining data section (a section other than the known signal) of the packet. When an element of time fluctuation is not present in the transmission channel, only this processing has to be performed. However, when an element of time fluctuation is present in the transmission channel, actual transmission channel characteristics gradually shifts from an estimation result of the head of the packet. Finally, the demodulation cannot be performed. Therefore, when a long OFDM packet is received or in mobile communication with intense transmission channel fluctuation, processing for tracking the transmission channel (transmission channel tracking processing) is necessary.

In processing considered to be effective as the transmission channel tracking processing, when a transmitter creates a transmission packet, for example, the known signal also inserted in the packet to allow the receiver to estimate a transmission channel. Actually, in a relatively new radio communication standard, this kind of consideration is paid. For example, in a radio communication standard called mobile WiMAX (IEEE802.16e), a technology for inserting a pilot sub-carrier for transmission channel estimation in a packet is adopted. On the other hand, in a relatively old standard such as IEEE802.11a, such consideration is not paid. There is no other way but to track the transmission channel fluctuation without using the known signal.

As a related art for performing the transmission channel tracking without using the known signal, for example, there is Japanese Patent Application Laid-Open No. 2002-44049 (hereinafter, "Patent Document 1"). In Patent Document 1, hard determination or soft determination is applied to a signal subjected to channel equalization processing, remaining frequency error correction processing, and sampling frequency error correction processing of reception processing to calculate a signal point during transmission as a reference signal. After the reference signal is calculated, the reference signal is compared with an actual reception signal point to calculate shifts of amplitude and a phase and perform various kinds of correction.

However, in the processing disclosed in Patent Document 1, pre-processing for converting a reception component into polar coordinates of amplitude and a phase is necessary in arithmetic processing for an amplitude ratio to the reference signal and arithmetic processing for a phase difference. An increase in a calculation amount is inevitable. Therefore, when the technology disclosed in Patent Document 1 is adopted, power consumption and a circuit size increase because of the increase in the calculation amount.

BRIEF SUMMARY OF THE INVENTION

One aspect of this invention is to provide a radio receiving apparatus comprising:

a Fourier transform unit that calculates in-phase channels and quadrature-phase channels of carrier waves from a reception signal obtained by receiving the multi-carrier signal;

a transmission-channel estimating unit that calculates transmission channel characteristics of the carrier waves from a known signal section of the reception signal;

a transmission-channel equalizing unit that receives an output of the Fourier transform unit as an input and performs processing for compensating for an amplitude change and a phase rotation in the output of the Fourier transform unit caused by a transmission channel;

a region determining unit that determines a region on a complex plane in which output data after transmission channel equalization is present; and a transmission-channel-fluctuation correcting unit that corrects, based on a determination result of the region determining unit, an estimation value of a phase rotation angle output to the transmission-channel equalizing unit by the transmission-channel estimating unit.

One aspect of this invention is to provide a radio receiving method comprising:

calculating in-phase channels and quadrature-phase channels of carrier waves from a reception signal obtained by receiving the multi-carrier signal;

calculating transmission channel characteristics of the carrier waves from a known signal section of the reception signal;

performing transmission channel equalization processing for compensating for an amplitude change and phase rotation in the in-phase channels and the quadrature-phase channels caused by a transmission channel;

determining a region on a complex plane in which output data after transmission channel equalization is present; and correcting, based on information concerning the determined region, an estimation value of a phase rotation angle used in performing the transmission channel equalization processing.

One aspect of this invention is to provide a radio receiving method comprising:

calculating in-phase channels and quadrature-phase channels of carrier waves from a reception signal obtained by receiving the multi-carrier signal;

calculating transmission channel characteristics of the carrier waves from a known signal section of the reception signal;

performing transmission channel equalization processing for compensating for an amplitude change and phase rotation in the in-phase channels and the quadrature-phase channels caused by a transmission channel;

determining a region on a complex plane in which output data after transmission channel equalization is present;

receiving the in-phase channels and the quadrature-phase channels in the output data after the transmission channel equalization as an input and calculating a power component of the reception signal;

correcting, based on information concerning the determined region, an estimation value of a phase rotation angle and an estimation value of amplitude fluctuation used in performing the transmission channel equalization processing; and correcting, based on information concerning the calculated power component, the estimation value of the amplitude fluctuation used in performing the transmission channel equalization processing.

BRIEF DESCRIPTION OF THE DRAWINGS

FIG. 2 is a diagram of data points in a BPSK modulation system;

FIG. 3 is a diagram of data points in a QPSK modulation system;

FIG. 12 is a diagram for explaining the operation of the region determining unit (during 16 QAM reception);

FIG. 13 is a diagram for explaining the operation of the region determining unit performed when there is phase fluctuation due to transmission channel fluctuation (during 16 QAM reception)

DETAILED DESCRIPTION OF THE INVENTION

Exemplary embodiments of A RADIO RECEIVING APPARATUS AND RADIO RECEIVING METHOD according to the present invention will be explained below in detail with reference to the accompanying drawings. The present invention is not limited to the following embodiments.

Figure 1:
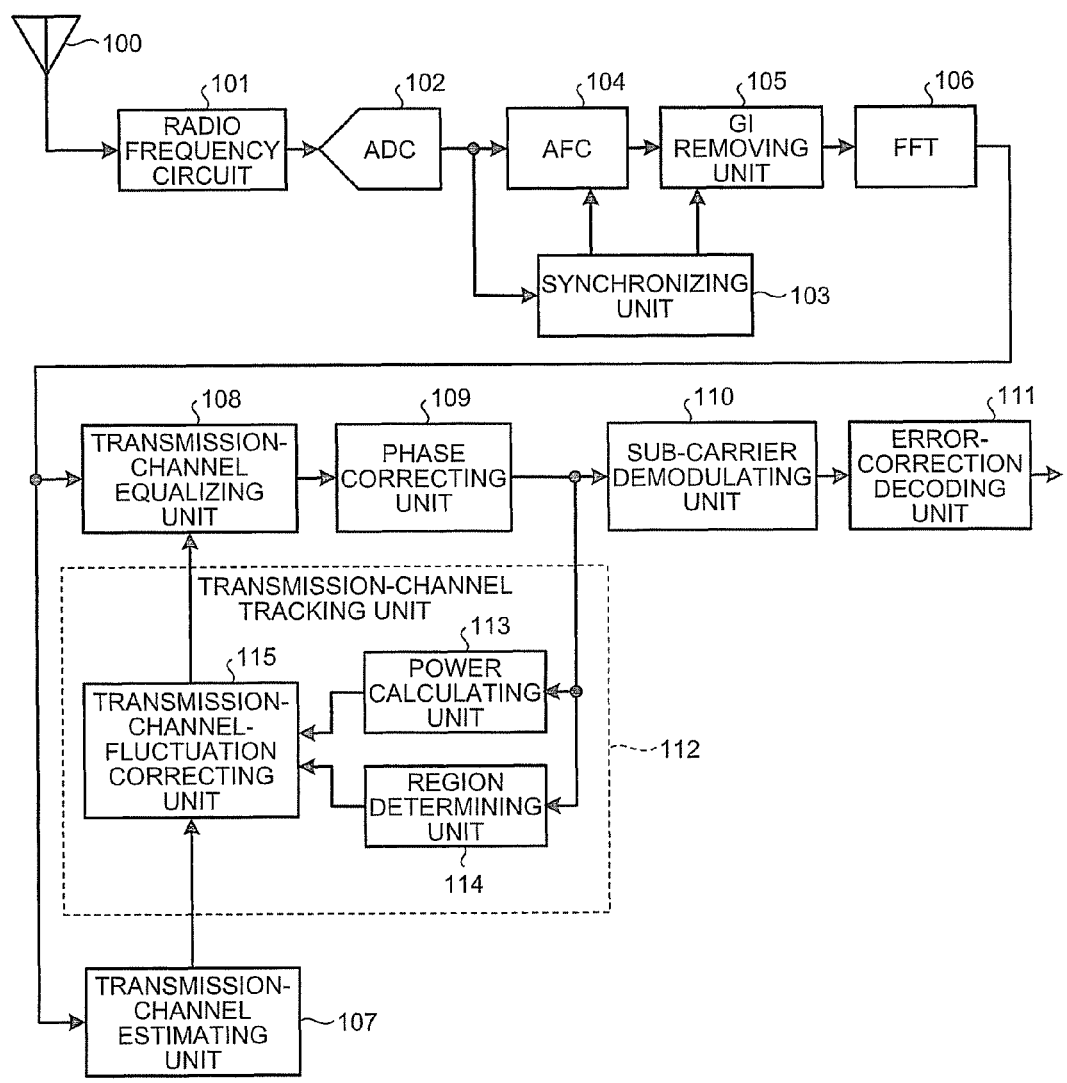
FIG. 1 is a block diagram of the configuration of a radio receiving apparatus.

FIG. 1 is a block diagram of the configuration of a radio receiving apparatus according to an embodiment of the present invention. As an example, the configuration of a radio receiving apparatus having an OFDM packet receiving function is shown. The radio receiving apparatus according to this embodiment includes a reception antenna 100, a radio frequency circuit 101, an analog-digital converter (ADC) 102, a synchronizing unit 103, an auto frequency control (AFC) circuit 104, a guard-interval (GI) removing unit 105, a fast Fourier transform (FFT) processing unit 106, a transmission-channel estimating unit 107, a transmission-channel equalizing unit 108, a phase correcting unit 109, a sub-carrier demodulating unit 110, an error-correction decoding unit 111, and a transmission-channel tracking unit 112. To embody a function of the transmission-channel tracking unit 112, the transmission-channel tracking unit 112 includes a power calculating unit 113, a region determining unit 114, and a transmission-channel-fluctuation correcting unit 115.

In a general receiving apparatus, correction processing executed after FFT processing in processing performed by the radio receiving apparatus targets three items explained below.

(1) Transmission Channel Characteristics

Transmission channel characteristics are fluctuation characteristics of amplitude and a phase not including temporal elements determined by a distance from a transmission point to a reception point, geographical features, and the like. Usually, the transmission channel characteristics are estimated by using a known signal (a preamble) present at the head of a radio frame and have different values for each of sub-carriers.

(2) Phase Fluctuation

Phase fluctuation is fluctuation in a phase caused by, for example, a difference between characteristics of oscillators mounted on a transmitter and a receiver. The phase fluctuation involves temporal fluctuation in a phase. However, similar phase shift (the same phase shift or regular phase shift) occurs in all the sub-carriers. Therefore, it is unnecessary to estimate the phase fluctuation for each of the sub-carriers.

(3) Transmission Channel Fluctuation

Transmission channel fluctuation is fluctuation caused by temporal changes of a distance from a transmission antenna to a reception antenna and a state of the transmission antenna and the reception antenna. The transmission channel fluctuation involves temporal fluctuations in a phase and amplitude. Like the transmission channel characteristics, the transmission channel fluctuation has a value different for each of the sub-carriers. The transmission channel fluctuation also has phase fluctuation. Therefore, in particular, when the transmission channel characteristic is distinguished from the phase fluctuation of (2), the phase fluctuation is represented as "phase fluctuation due to the transmission channel fluctuation".

The radio receiving apparatus according to this embodiment has correcting functions for correcting the items (1) to (3) explained above. The transmission-channel tracking unit 112 as a principal part of the radio receiving apparatus according to this embodiment expands, in particular, the correcting function for the item (3).

In FIG. 1, a radio signal detected by the reception antenna 100 is down-converted from a radio frequency into a baseband signal by the radio frequency circuit 101. The down-converted signal is converted into a digital signal by the AD converter 102 and input to the synchronizing unit 103 and the AFC circuit 104.

The synchronizing unit 103 detects boundaries of symbols in an OFDM packet and outputs a desired timing signal to the AFC circuit 104 and the GI removing unit 105. The AFC circuit 104 performs an arithmetic operation for correcting a radio frequency error between a transmitter and a receiver according to the timing signal. The GI removing unit 105 discards a sample in a guard interval period unnecessary for reception arithmetic operation according to the timing signal. A signal having passed through the GI removing unit 105 is subjected to discrete Fourier transform by the FFT processing unit 106. An in-phase channel and a quadrature-phase channel for each of carrier waves are calculated.

In the radio receiving apparatus according to this embodiment, BPSK, QPSK, 16 QAM, 64 QAM, and the like are assumed as a sub-carrier modulation system. For example, when BPSK is adopted as the sub-carrier modulation system, the transmitter receives, for each of sub-carriers, one data bit to which an error correction code is applied. The transmitter allocates the data bit to a data point (a data point in the BPSK modulation system on a complex plane) 200 or 201 in the BPSK modulation system shown in FIG. 2 and generates and transmits a transmission signal having a component of the data point.

When QPSK is adopted as the sub-carrier modulation system, as in the BPSK modulation system, the transmitter receives, for each of sub-carriers, two data bits to which an error correction code is applied. The transmitter allocates the data bits to any one of data points 300 to 303 in the QPSK modulation system shown in FIG. 3 and generates and transmits a transmission signal having a component of the data point.

Figure 4:
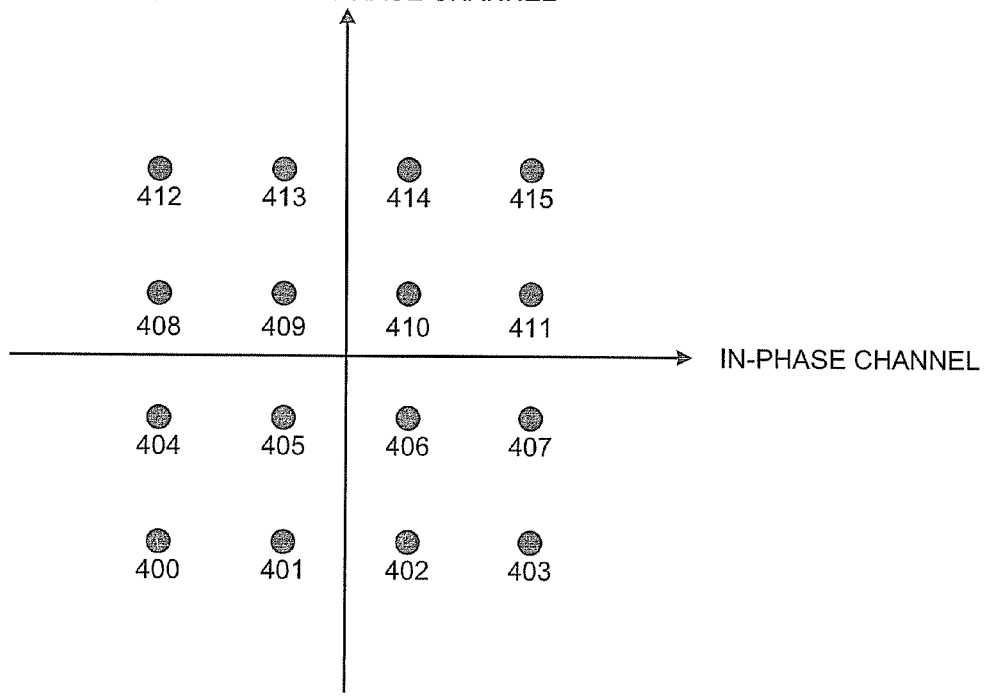
FIG. 4 is a diagram of data points in a 16 QAM modulation system.
Figure 5:
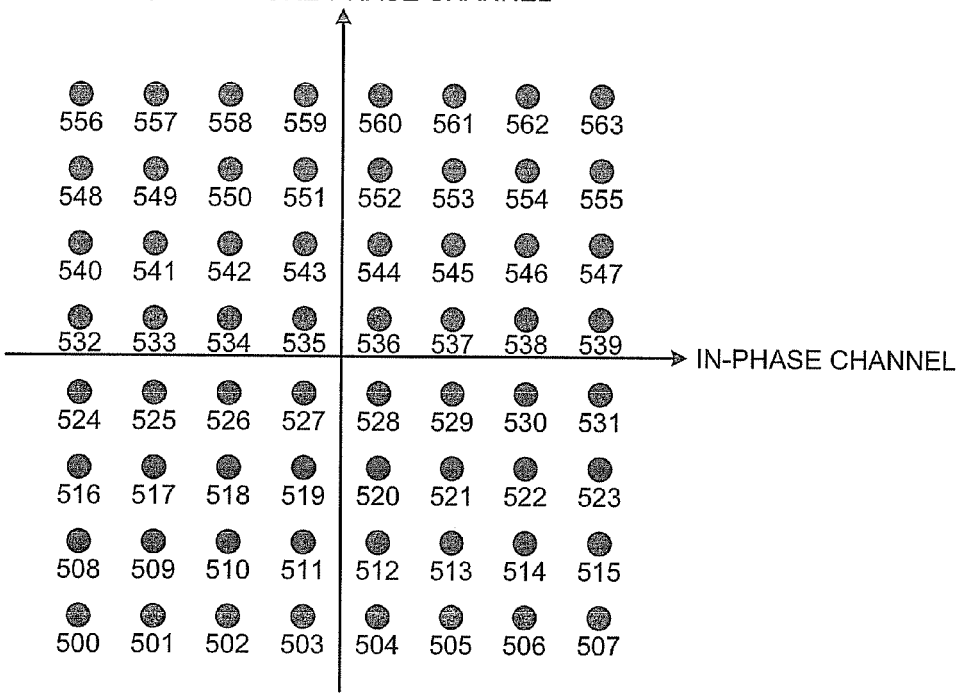
FIG. 5 is a diagram of data points in 64 QAM modulation system.

Similarly, in the case of 16 QAM, the transmitter performs processing for receiving four data bits and allocating the data bits to any one of data points 400 to 415 in the 16 QAM modulation system shown in FIG. 4 and generates and transmits a transmission signal having a component of the data point. In the case of 64 QAM, the transmitter performs processing for receiving six data bits and allocating the data bits to any one of data points 500 to 563 in the 64 QAM modulation system shown in FIG. 5 and generates and transmits a transmission signal having a component of the data point.

Figure 6:
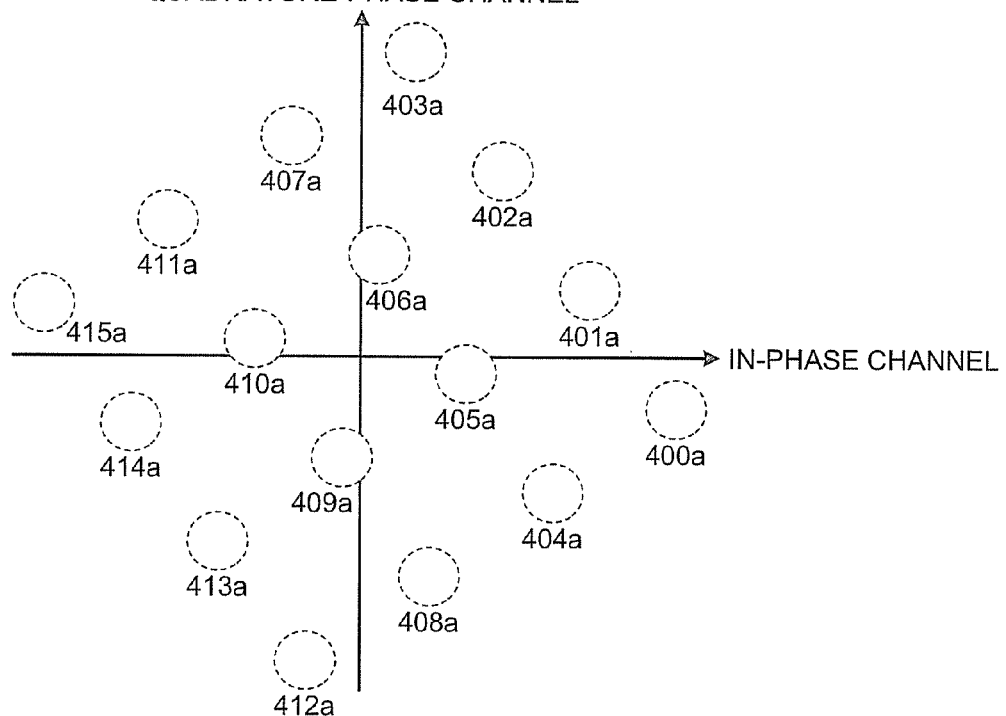
FIG. 6 is a diagram of an example of FFT output data points in received data of the 16 QAM modulation system.

Components of the sub-carriers after the FFT processing in the receiver appear according to transmission channel characteristics of the sub-carriers in a state in which amplitude and a phase are shifted. When the receiver receives an OFDM packet modulated by 16 QAM shown in FIG. 4, an FFT output of the OFDM packet can be represented, for example, as shown in FIG. 6. Reception points 400a to 415a shown in FIG. 6 respectively correspond to the transmission points 400 to 415 shown in FIG. 4. In FIG. 6, the reception points are indicated by broken lines to mean that positions (ranges) of presence of the reception points expand. Not only in the OFDM communication but also in radio communication in general, noise is superimposed on a radio signal in a process of transmitting the radio signal. As a result, in the receiver, the ranges of presence of the reception points expand according to the level of the noise.

To acquire a correct data bit from an output of the FFT processing unit 106, work for compensating for the shifts of amplitude and a phase (transmission channel equalization) is necessary. For the work, first, it is necessary to estimate transmission channel characteristics for the sub-carriers. On the other hand, at the head of the OFDM packet, there is a known signal section to which a known signal is allocated. It is possible to estimate the transmission channel characteristics using the known signal.

Figure 7:
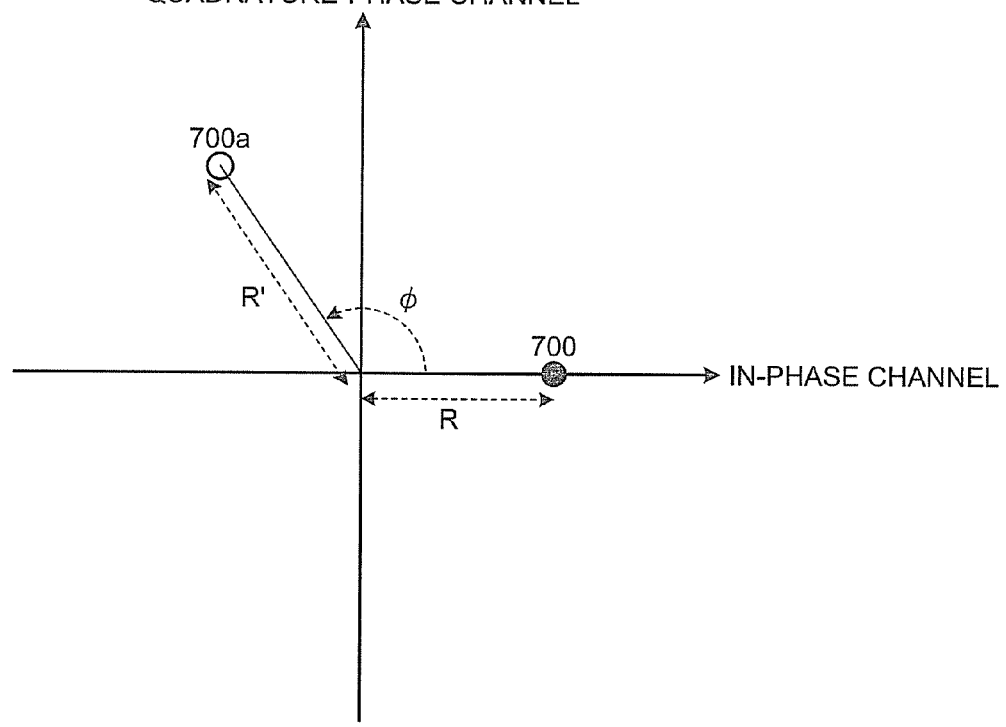
FIG. 7 is a diagram for explaining arithmetic processing by a transmission-channel estimating unit.

FIG. 7 is a diagram for explaining arithmetic processing by the transmission-channel estimating unit 107. In FIG. 7, a point 700 indicated by a black circle represents a transmission point of transmission of the known signal. A point 700a indicated by a white circle represents an FFT output point during reception (an output point of FFT processing performed when data corresponding to the transmission point is received). Compared with the FFT output during transmission, an FFT output during reception rotates in the counter-clockwise direction by an angle φ and the amplitude thereof is R'/R times larger. The transmission-channel estimating unit 107 calculates an amplitude ratio R'/R and the phase rotation angle (I) from the reception point 700a. The calculated amplitude ratio R'/R and the phase rotation angle φ are referred to as transmission channel estimation values. When the transmission-channel tracking unit 112 is not provided, the transmission channel estimation values estimated by the transmission-channel estimating unit 107 are input to the transmission-channel equalizing unit 108.

The transmission-channel equalizing unit 108 performs processing called transmission channel equalization processing using the transmission channel estimation values estimated by the transmission-channel estimating unit 107. Specifically, the transmission-channel equalizing unit 108 multiplies amplitude expanded or compressed by the fluctuation in a transmission channel with R/R' to compensate for the amplitude and applies a rotational arithmetic operation to a phase rotated by the angle φ to compensate for the phase to an original phase.

Figure 8:
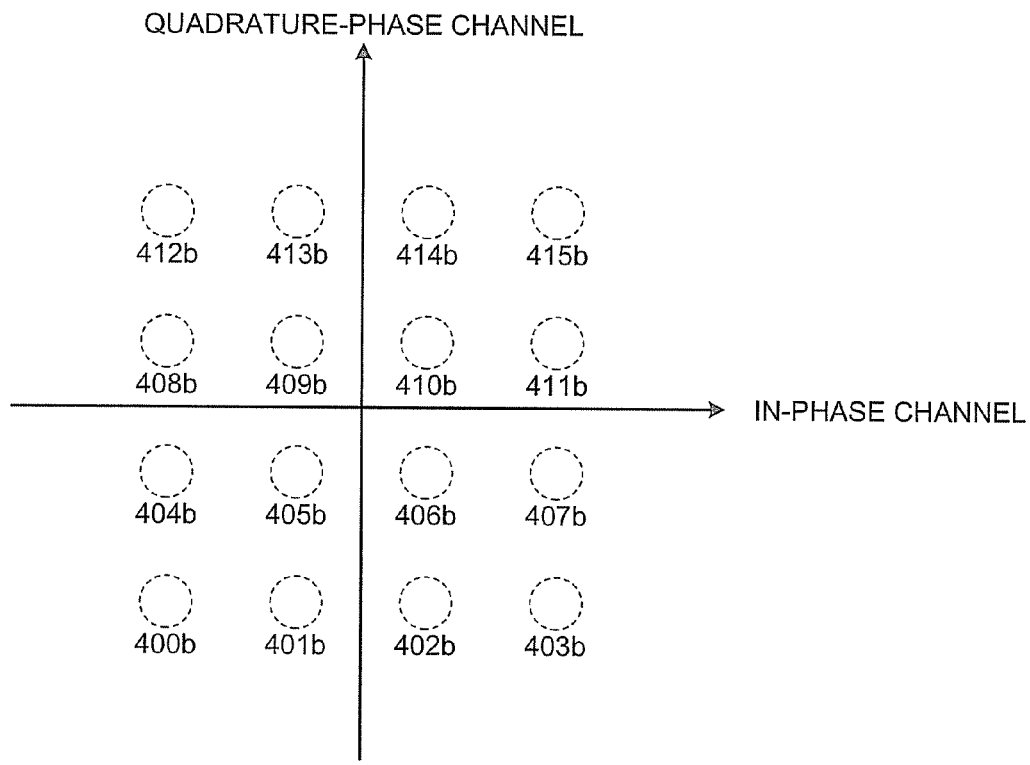
FIG. 8 is a diagram of an example of data points after transmission channel equalization of the received data of the 16 QAM modulation system.

FIG. 8 is a diagram of an example reception data points after the transmission channel equalization in the 16 QAM modulation system. Specifically, reception data points obtained by applying the transmission channel equalization processing to the FFT output data points shown in FIG. 6 are shown. When FIG. 4 (the original transmission data point) and FIG. 8 are compared, positions of the original transmission data points of a reception FFT output and positions of reception data points obtained by applying the transmission channel equalization processing to the reception FFT output and compensate for the reception FFT output are substantially the same. These positions do not completely coincide with each other. This is because there is a difference between a characteristic of the transmitter and a characteristic of the receiver (see the above explanation of "phase fluctuation").

For example, when there is a shift between an AD conversion frequency of the transmitter and an AD conversion frequency of the receiver (the AD converter 102), phase rotation corresponding to the shift occurs. The phase rotation is also caused by a remaining radio frequency error between the transmitter and the receiver that cannot be fully removed by the AFC circuit 104. Further, the phase rotation is also caused by a difference in phase noise between the transmitter and the receiver. The phase shifts due to the characteristics of the transmitter and the receiver are corrected by the phase correcting unit 109. In the data section of the OFDM packet, known signals for phase rotation estimation are present in places. Therefore, the phase correcting unit 109 estimates and corrects the phase shifts using the known signals. However, the known signals are not present so densely enough for re-estimating a transmission channel.

Sub-carrier components returned from the reception data points to positions near the transmission data points by the transmission-channel equalizing unit 108 and the phase correcting unit 109 are demodulated to original data bits by the sub-carrier demodulating unit 110. The demodulated data bits are decoded to original data by the error-correction decoding unit 111. The reception processing excluding the processing by the transmission-channel tracking unit 112 is generally explained above.

When transmission channel fluctuation occurs, as time elapses, a shift gradually occurs between a transmission channel estimation value estimated at the head of a packet (i.e., a known signal) and an actual transmission channel estimation value. As a result, shifts occur in amplitudes and phases of signal points subjected to the equalization processing by the transmission-channel equalizing unit 108 and the phase correction processing by the phase correcting unit 109. A function of the transmission-channel tracking unit 112 is to detect the shifts of amplitudes and phases, correct a transmission channel estimation value every time the shifts are detected, and prevent deterioration in a reception quality due to the transmission channel fluctuation. When a relatively short packet is transmitted or in a relatively short period, transmission channel fluctuation can be corrected only by the transmission-channel estimating unit 107, the transmission-channel equalizing unit 108, and the phase correcting unit 109. However, when a long packet is transmitted or when the elapse of time cannot be neglected, transmission channel fluctuation can be corrected by adding the transmission-channel tracking unit 112.

As shown in FIG. 1, the transmission-channel tracking unit 112 is inserted among the transmission-channel estimating unit 107, the transmission-channel equalizing unit 108, and the phase correcting unit 109 to form a forward loop for controlling the transmission-channel equalizing unit 108 based on an output of the transmission-channel estimating unit 107 and a feedback loop for controlling the transmission-channel equalizing unit 108 based on an output of the phase correcting unit 109.

In the transmission-channel tracking unit 112, the power calculating unit 113 detects an amplitude shift in transmission channel fluctuation and the region determining unit 114 detects a phase shift in the transmission channel fluctuation. The transmission-channel-fluctuation correcting unit 115 receives detection signals of the power calculating unit 113 and the region determining unit 114 and corrects a transmission channel estimation value. As explained above, the transmission channel characteristics are different depending on the sub-carriers. Therefore, it is desirable to perform the transmission channel tracking processing for each of the sub-carriers.

A principle of amplitude correction is explained below. To facilitate understanding, all amplitude values are standardized with average amplitude R of transmission data points (R=1). When the amplitude values are standardized in this way, the amplitude ratio R'/R is R' (R' is hereinafter referred to as "amplitude characteristic value"). On the other hand, an amplitude value (i.e., an FFT output) of data points in a transmission channel to be tracked is represented as D. In BPSK and QPSK, a value of D is a value of R' added with noise. In 16 QAM and 64 QAM, amplitude could take various values depending on data. However, a value obtained by power-averaging amplitudes of all the data points is R'. Therefore, if the value of D is smoothed to sufficiently suppressing an amplitude fluctuation component that are data-dependent and a noise component, the amplitude characteristic value R' is obtained. Therefore, an amplitude value after further subjecting data after the FFT output to transmission channel equalization is D/R'.

When it is assumed that the amplitude characteristic value changes from R' to R" because of transmission channel fluctuation, D smoothed with power of D is R". Therefore, R" can be represented by using the following formula:

$$R''=\sqrt{(\alpha D^2+(1-\alpha)R'''^2)} \quad (1)$$

where, $\alpha$ is a smoothing parameter and is a constant.

A component that realizes arithmetic processing by Formula (1) is the transmission-channel tracking unit 112. The transmission-channel tracking unit 112 is forward-connected and feedback-connected among the transmission-channel estimating unit 107, the transmission-channel equalizing unit 108, and the phase correcting unit 109. Therefore, an arithmetic operation by Formula (1) is recursively executed based on the following formula:

$$R_1''=R_0'$$

$$R_2''=\sqrt{(\alpha D_1^2+(1-\alpha)R_1''^2)}$$

$$R_3''=\sqrt{(\alpha D_2^2+(1-\alpha)R_2''^2)}$$

$$\cdots$$

$$R_{n+1}''=\sqrt{(\alpha D_n^2+(1-\alpha)R_n''^2)} \quad (2)$$

In Formula (2), $R_1''$ represents an amplitude characteristic value of a first symbol output from the transmission-channel tracking unit 112. $R_n''$ represents an amplitude characteristic value of an nth symbol output from the transmission-channel tracking unit 112. $R_0'$ represents a transmission channel estimation value (an amplitude component) estimated by using a known signal. The transmission channel estimation value is generated by the transmission-channel estimating unit 107. In the first symbol, there is no feedback component input to the transmission-channel tracking unit 112. Therefore, the transmission channel estimation value $R_0'$ estimated by the transmission-channel estimating unit 107 is directly output to the transmission-channel equalizing unit 108. However, in the second and subsequent symbols, the amplitude characteristic value R" calculated by the transmission-channel tracking unit 112 is output to the transmission-channel equalizing unit 108 as a new transmission channel estimation value.

Attention is paid to an output of the phase correcting unit 109. The output of the phase correcting unit 109 is an output obtained by performing transmission channel equalization processing and phase correction processing. A value obtained by raising amplitudes of an in-phase channel and a quadrature-phase channel of the output to the second power can be represented as $(D_n/R_n'')^2$ at a point when data of the nth symbol is output. This square value corresponds to the power of the data of the nth symbol. Therefore, if the square value is represented as $P_n$ and substituted in Formula (2) and the formula is arranged, an amplitude characteristic value can be represented by the following formula:

$$R_{n+1}''=R_n''[\sqrt{(1+\alpha(P_n-1))}] \quad (3)$$

Formula (3) means that it is possible to generate a new transmission channel estimation value R" by multiplying an old transmission channel estimation value R" with a parameter $\sqrt{(1+\alpha(P_n-1)}$ including an element of power.

Figure 9:
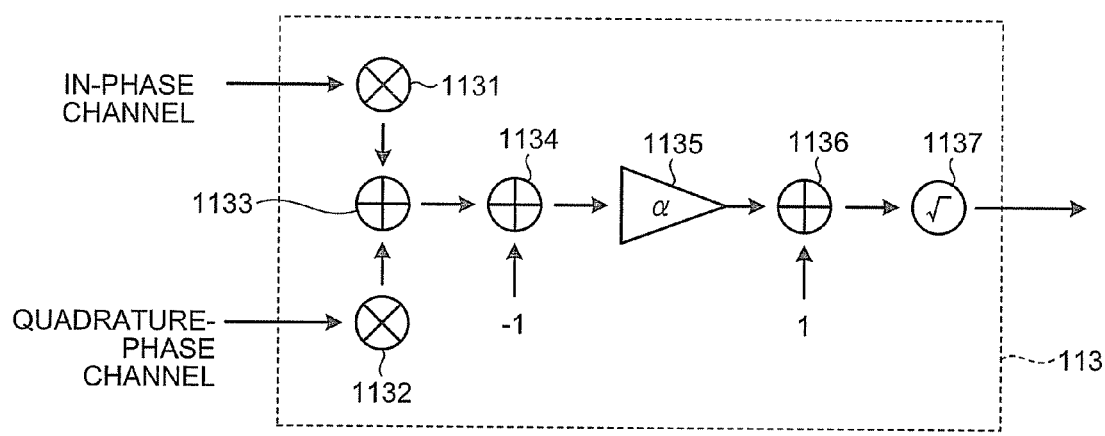
FIG. 9 is a diagram of the detailed configuration of a power calculating unit.

FIG. 9 is a diagram of the detailed configuration of the power calculating unit 113. In the power calculating unit 113, first, an in-phase channel and a quadrature-phase channel input thereto are respectively raised to the second power by multipliers 1131 and 1132 and added up by an adder-subtracter 1133 to be a value of P ($P_n$). After being subjected to three kinds of arithmetic processing by constant adders 1134 and 1136 and a constant multiplier 113, the value is processed by a square root operator 1137 to be the parameter $\sqrt{(1+\alpha(P_n-1)}$ that is a ratio of a new transmission channel estimation value and an old transmission channel estimation value. This value is output from the power calculating unit 113 to the transmission-channel-fluctuation correcting unit 115. In the transmission-channel-fluctuation correcting unit 115, it is possible to track transmission channel amplitude fluctuation by multiplying old transmission channel amplitude with the value of the parameter to obtain new transmission channel amplitude.

The smoothing parameter α is examined. For example, when the QAM modulation is used as the sub-carrier modulation system, it is possible to practically set the smoothing parameter α to a value sufficiently smaller than 1. As it is understood if attention is paid to Formula (2), the smoothing parameter α sufficiently smaller than 1 means an idea that greater importance is attached to the value in the past ($R_n''$) than the present value ($D_n$). This idea acts favorably in terms of suppressing cumulative accumulation of errors in a section that cannot be corrected. Therefore, if a condition that the smoothing parameter α is sufficiently smaller than 1 is added, Formula (3) is modified as indicated by the following formula:

$$R_{n+1}''=R_n''[1+(\alpha/2)(P_n-1)] \quad (4)$$

Figure 10:
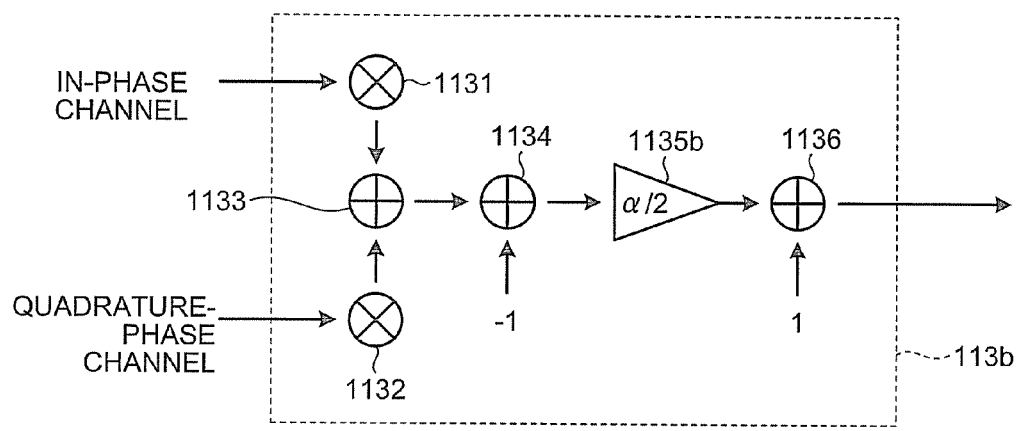
FIG. 10 is a diagram of the detailed configuration of a power calculating unit that performs simplified arithmetic processing.

FIG. 10 is a diagram of the configuration of the power calculating unit 113 shown in FIG. 9 simplified by using Formula (4). Specifically, it is possible to omit the square root operator 1137 from the configuration shown in FIG. 9 by adding the condition that the smoothing parameter α is sufficiently smaller than α.

Figure 11:
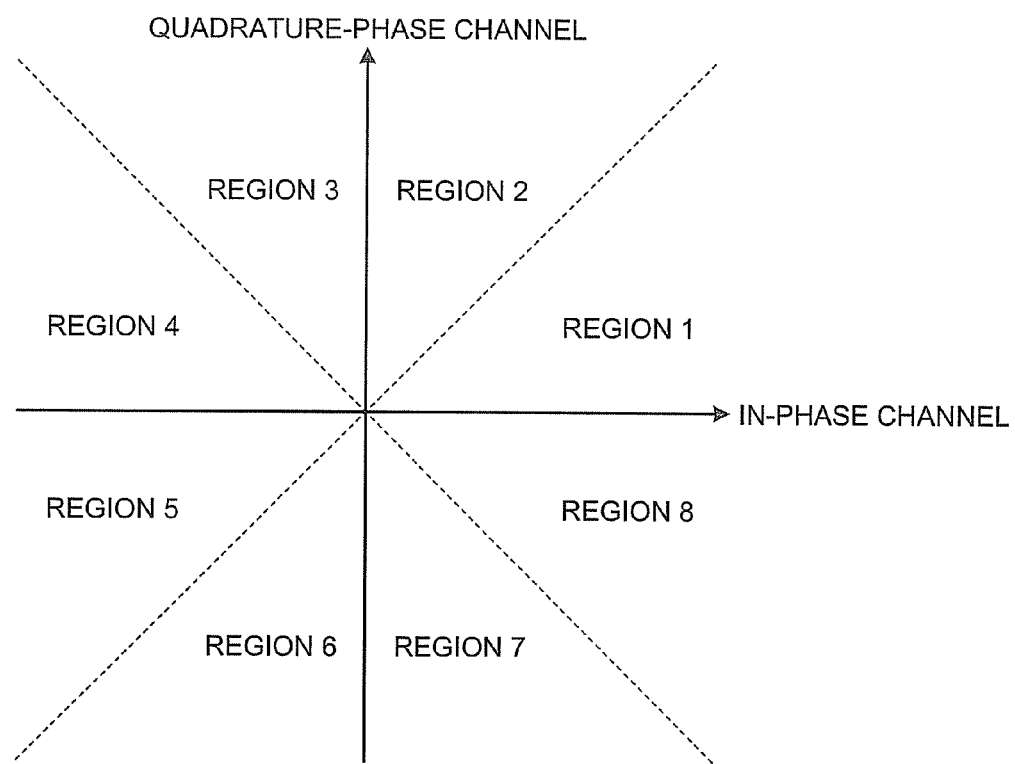
FIG. 11 is a diagram of determination regions of a region determining unit.

The region determining unit 114 determines, based on an in-phase channel and a quadrature-phase channel of an output of the phase correcting unit 109, in which region on a complex plane the output of the phase correcting unit 109 is present. A region on the complex plane determined by region determining unit 114 is divided into eight regions as shown in FIG. 11.

Specifically, the region determining unit 114 monitors the output of the phase correcting unit 109 and determines that the output is present in (a) a region 1 when the in-phase channel is positive, the quadrature-phase channel is positive, and an absolute value of the in-phase channel is larger than an absolute value of the quadrature-phase channel;

(b) a region 2 when the in-phase channel is positive, the quadrature-phase channel is positive, and the absolute value of the in-phase channel is smaller than the absolute value of the quadrature-phase channel;

(c) a region 3 when the in-phase channel is negative, the quadrature-phase channel is positive, and the absolute value of the in-phase channel is smaller than the absolute value of the quadrature-phase channel;

(d) a region 4 when the in-phase channel is negative, the quadrature-phase channel is positive, and the absolute value of the in-phase channel is larger than the absolute value of the quadrature-phase channel;

(e) a region 5 when the in-phase channel is negative, the quadrature-phase channel is negative, and the absolute value of the in-phase channel is larger than the absolute value of the quadrature-phase channel;

(f) a region 6 when the in-phase channel is negative, the quadrature-phase channel is negative, and the absolute value of the in-phase channel is smaller than the absolute value of the quadrature-phase channel;

(g) a region 7 when the in-phase channel is positive, the quadrature-phase channel is negative, and the absolute value of the in-phase channel is smaller than the absolute value of the quadrature-phase channel; and (h) a region 8 when the in-phase channel is positive, the quadrature-phase channel is negative, and the absolute value of the in-phase channel is larger than the absolute value of the quadrature-phase channel.

When QPSK, 16 QAM, or 64 QAM is used, the regions 1, 3, 5, and 7 are referred to as odd number regions and the regions 2, 4, 6, and 8 are referred to as even number regions. When there is no phase shift due to transmission channel fluctuation, a presence range of reception points is, for example, as shown in FIG. 12. A probability that the reception points are present in the odd number regions and a probability that the reception points are present in the even number regions are the same.

On the other hand, when a phase shifts to a positive side because of transmission channel fluctuation, the presence range of the reception points is, for example, as shown in FIG. 13. The probability that the reception points are present in the odd number regions decreases and the probability that the reception points are present in the even number regions increases. This is because points present near region boundaries such as points 400d, 403d, 405d, 406d, 4009d, 410d, 412d, and 415d move counterclockwise and closer to the even number region side. Conversely, when the phase shifts to a negative side, the probability that the reception points are present in the odd number regions increases and the probability that the reception points are present in the even number regions decreases.

The region determining unit 114 notifies the transmission-channel-fluctuation correcting unit 115 of information concerning the region determination. The transmission-channel-fluctuation correcting unit 115 finely adjusts a phase rotation angle based on the received region information. For example, when it is determined that the reception points are present in the odd number regions, it is highly likely that the transmission channel phase shifts to the negative side. Therefore, the transmission-channel-fluctuation correcting unit 115 generates a correction value obtained by shifting the value of the phase rotation angle φ to the negative side by a predetermined very small amount (Δφ). Conversely, when it is determined that the reception points are present in the even number regions, it is highly likely that the transmission channel phase shifts to the positive side. Therefore, the transmission-channel-fluctuation correcting unit 115 generates a correction value obtained by shifting the value of the phase rotation angle φ to the positive side by the predetermined very small amount (Δφ). Information concerning the correction is notified to the transmission-channel equalizing unit 108. The transmission-channel equalizing unit 108 performs processing for compensating for the phase. Such a series of processing makes it possible to cause the phase rotation angle to track the phase fluctuation due to the transmission channel fluctuation.

Figure 14:
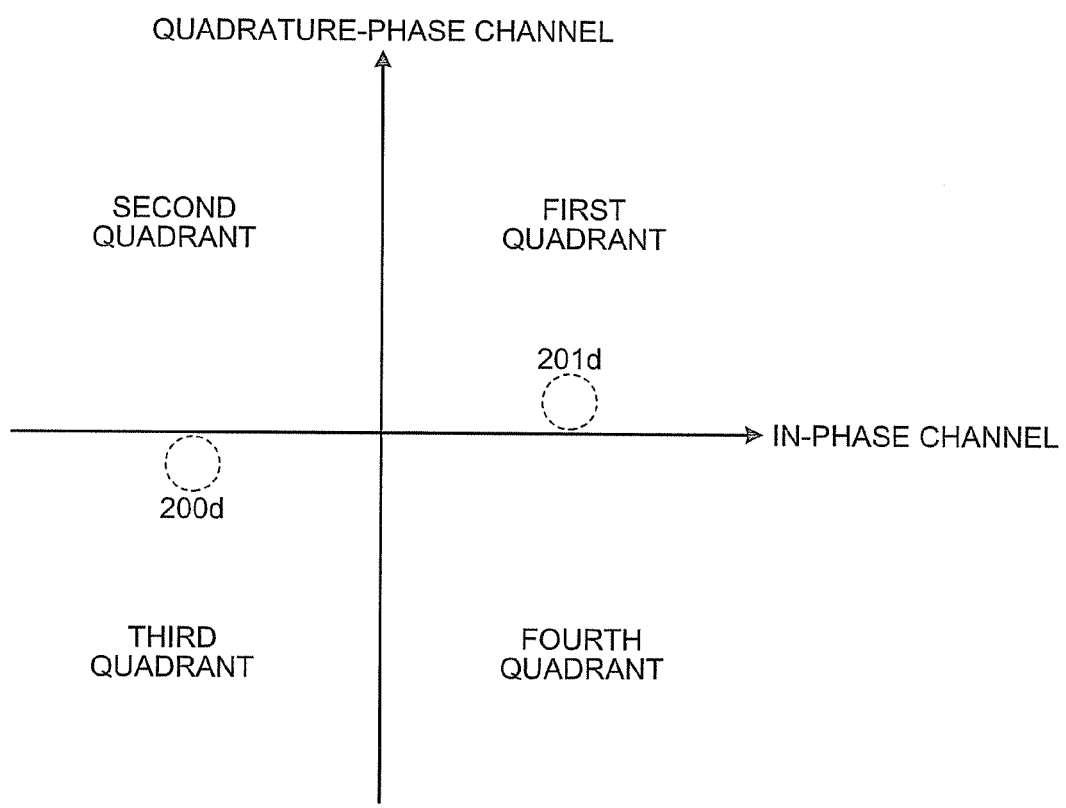
FIG. 14 is a diagram for explaining the operation of the region determining unit performed when there is phase fluctuation due to transmission channel fluctuation (during BPSK reception).

Concerning BPSK, a correspondence relation between regions and phase correction directions is different. FIG. 14 is a diagram of regions in which reception points in the BPSK modulation system are present when the phase fluctuation due to the transmission channel fluctuation shifts to the positive side. In the case of BPSK, the region is divided into odd number quadrants and even number quadrants. When it is determined that the reception points are present in the odd number quadrants, the transmission channel phase only has to be finely corrected to the positive side. When it is determined that the reception points are present in the even number quadrants, the transmission channel phase only has to be finely corrected to the negative side.

Even if the phase shifts to the positive side, when a data point itself (e.g., a data point 404d shown in FIG. 13) is present in the odd number region, there is concern that it is determined that the data point is present in the odd number region and correction is performed in a wrong direction. However, the number of data points completely present in the odd number regions such as points 402d, 404d, 411d, and 413d and the number of data points completely present in the even number regions such as points 401d, 407d, 414d, and 408d are the same. In usual radio communication, probabilities that the respective data points are adopted are standardized to be equal. Therefore, irrespectively of a phase shift, correction by the data points is offset on the positive side and the negative side in terms of probabilities. In other words, it is extremely less likely that correction is performed in a wrong direction because of data points not present near region boundaries.

However, as such data points not present near the region boundaries increase, a frequency of region determination according to the phase shift decreases. For example, in BPSK and QPSK, all the data points are present on the region boundaries. However, in the case of 16 QAM, only a half of the data points are present near the region boundaries. Therefore, in the case of 16 QAM, a probability that the phase shift is correctly determined by the region determination is a half. In the case of 64 QAM, the probability that the phase shift is correctly determined is a quarter. The likelihood that even data points near the region boundaries are corrected in the opposite direction depending on the level of noise cannot be denied. Therefore, to sufficiently offset mis-correction due to factors other than the transmission channel fluctuation, it is desirable that a phase correction amount in one determination is sufficiently small. The phase correction amount in one determination fluctuates according to a type of a modulation system and a level of transmission channel fluctuation. Therefore, it is desirable to reduce the phase correction amount according to an increase in a multi-value degree of the modulation system and reduce the phase correction amount according to a fluctuation ratio of the transmission channel fluctuation.

An effect realized by the radio receiving apparatus according to this embodiment is explained below. In the explanation, a method according to this embodiment is compared with the method disclosed in Patent Document 1 referred to in the description of the related art. Arithmetic processing amounts by both the methods are compared. As the tracking of the transmission channel fluctuation, there are processing for causing the phase rotation angle to track the phase fluctuation due to the transmission channel fluctuation (hereinafter referred to as "phase rotation angle tracking processing") and processing for causing the amplitude characteristic value to track the fluctuation width fluctuation of the transmission channel. Therefore, in the comparison, these kinds of processing are distinguished.

In the phase rotation angle tracking processing disclosed in Patent Document 1, first, hard determination is applied to reception points having in-phase channels and quadrature-phase channels in coordinates to find a reference signal point. Subsequently, phases of the reception points and the reference signal point are compared to correct a phase rotation angle. In the hard determination, a comparison arithmetic operation is performed by the number of data bits. Specifically, the comparison arithmetic operation is performed once in BPSK, performed twice in QPSK, performed four times in 16 QAM, and performed six times in 64 QAM. Thereafter, a data table is referred to for the phase of the reference signal point based on a determination result (the table reference is performed once). Phase calculation processing is performed to learn the phases of the reception points. The phase calculation processing is realized by dividing a quadrature-phase channel by an in-phase channel to calculate a tangent of a phase (the division is performed once) and referring to an arctangent table (the table reference is performed once). After calculating a difference between phases of reception points calculated last and the reference signal point, transmission channel phase correction is performed. The transmission channel phase correction can be realized by performing the addition and subtraction twice. Specifically, in the phase rotation angle tracking processing disclosed in Patent Document 1, the comparison arithmetic operation based on the modulation system is performed once to six times, the addition and subtraction is performed twice, the division is performed once, and the table reference is performed twice. The scale of the arithmetic processing is small in the comparison arithmetic operation and the addition and subtraction. As the number of times of large-scale arithmetic operations, the division is performed once and the table reference is performed twice.

On the other hand, in the phase rotation angle tracking processing according to this embodiment, first, region determination is performed. Determination processing for the region determination can be realized by performing the comparison arithmetic operation three times. Subsequently, fine correction for a transmission channel phase is performed. Correction processing for the fine correction can be realized by performing the addition and subtraction only once. In this way, the phase rotation angle tracking processing according to this embodiment can be realized by requiring large-scale arithmetic operations such as the multiplication, the division, and the table reference.

In the amplitude characteristic value tracking processing disclosed in Patent Document 1, first, concerning the reference signal point subjected to the hard determination, a value of the amplitude thereof is read out to the data table (the table reference is performed once). Subsequently, amplitudes of present reception points are calculated. Processing for calculating the amplitudes is attained by respectively raising in-phase channels and quadrature-phase channels to the second power and adding up the in-phase channels and the quadrature-phase channels (the multiplication is performed twice and the addition is performed once) and performing a square root operation (the square root operation is performed once). Finally, a ratio of the amplitudes of the reception points and the amplitude of the reference point is calculated (the division is performed once) and the present amplitude characteristic value is multiplied with a value of the ratio (the multiplication is performed once). As a result, in the amplitude characteristic value tracking processing disclosed in Patent Document 1, as the number of times of the large-scale arithmetic operations, the multiplication is performed three times, the division is performed once, the square root operation is performed once, and the table reference is performed once.

On the other hand, in the amplitude characteristic value tracking processing according to this embodiment, the configuration shown in FIG. 10 is used for calculation (using an approximation formula). When the power calculation processing is performed, the square operation is performed twice and the addition is performed once. When an amplitude correction parameter is calculated, in addition to the square operation and the addition, addition is performed twice and constant multiplication is performed once. However, the scale of the constant multiplication is small because the constant multiplication can be performed by bit-shift operation or the like. Finally, when an amplitude characteristic value is updated, the multiplication is performed once. Therefore, in the amplitude characteristic value tracking processing according to this embodiment, as the number of times of the large-scale arithmetic operations, only the multiplication is performed three times.

When both the phase rotation angle tracking processing and the amplitude characteristic value tracking processing are performed, in the tracking processing disclosed in Patent Document 1, the multiplication is performed three times, the division is performed twice, the square root operation is performed once, and the table reference is performed three times. On the other hand, in the tracking processing according to this embodiment, only the multiplication is performed three times.

In this way, with the radio receiving apparatus according to this embodiment, even when the transmission channel tracking function is added, an amount of the large-scale arithmetic operations can be reduced. This makes it possible to suppress an increase in power consumption and a circuit size.

The radio receiving apparatus according to the embodiment of the present invention has been explained in detail with reference to FIGS. 1 to 14. However, the configuration of the present invention is not limited to the content disclosed above. Various modifications are possible without departing from the gist of the present invention.

For example, in the configuration shown in FIG. 1, the transmission-channel tracking unit 112 includes both the power calculating unit 113 and the region determining unit 114. However, the transmission-channel tracking unit 112 can include only the region determining unit 114. When the transmission-channel tracking unit 112 includes the region determining unit 114, under a situation in which transmission channel fluctuation is present, the transmission-channel tracking unit 112 can cause a value of a phase, which substantially affects reception performance, to track the transmission channel fluctuation. This makes it possible to suppress deterioration in the reception performance. When the transmission-channel tracking unit 112 further includes the power calculating unit 113, the transmission-channel tracking unit 112 can also perform tracking processing for an amplitude characteristic value. Therefore, the effect of suppressing the deterioration in the reception performance is increased.

For example, in the configuration shown in FIG. 1, an output of the phase correcting unit 109 is an input to the power calculating unit 113 and the region determining unit 114. However, an output of the transmission-channel equalizing unit 108 can be an input to the power calculating unit 113 and the region determining unit 114. Further, an output of the phase correcting unit 109 can be an input to the region determining unit 114. An output of the transmission-channel equalizing unit 108 can be an input to the power calculating unit 113. Conversely, an output of the phase correcting unit 109 can be an input of the power calculating unit 113. An output of the transmission-channel equalizing unit 108 can be an input to the region determining unit 114. Originally, the phase correcting unit 109 is provided to correct phase fluctuation due to a difference between characteristics of the transmitter and the receiver. Therefore, the phase correction processing by the phase correcting unit 109 can be executed before the transmission channel tracking processing is performed or can be executed after the transmission channel tracking processing is performed. Therefore, as the feedback input to the power calculating unit 113 and the region determining unit 114, an output before or after the phase correcting unit 109 can be used.

If there is no substantial difference between the characteristic of the transmitter and the characteristic of the receiver, the configuration of the phase correcting unit 109 can be omitted.

As explained above, the radio receiving apparatus according to this embodiment calculates in-phase channels and quadrature-phase channels of carrier waves from a reception signal obtained by receiving a multi-carrier signal, calculates transmission channel characteristics of the carrier waves from a known signal section of the reception signal, performs the transmission channel equalization processing for compensate for an amplitude change and phase rotation applied to the in-phase channels and the quadrature-phase channels from the transmission channel, determines a region on a complex plane in which output data after the transmission channel equalization processing is present, and corrects, based on information concerning the determined region, an estimation value of a phase rotation angle used in performing the transmission channel equalization processing. Therefore, an arithmetic processing amount in adding the function of transmission channel tracking can be reduced. This makes it possible to suppress an increase in power consumption and a circuit size.

In this embodiment, the radio receiving apparatus applied to the OFDM transmission system for performing signal transmission using a plurality of sub-carriers is explained as an example. However, the present invention is not limited to only the OFDM transmission system. For example, it is also possible to apply the radio receiving apparatus to multi-carrier CDMA (MC-CDMA) for performing diffusion processing in a frequency axis direction and multi-carrier CDMA (MC/DS-CDMA) for performing diffusion processing in a time axis direction using a plurality of sub-carriers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio receiving apparatus that receives a multicarrier signal, comprising:
   a Fourier transform unit that calculates in-phase channels and quadrature-phase channels of carrier waves from a reception signal obtained by receiving the multicarrier signal;
   a transmission-channel estimating unit that calculates transmission channel characteristics of the carrier waves from a known signal section of the reception signal;
   a transmission-channel equalizing unit that receives an output of the Fourier transform unit as an input and performs processing for compensating for an amplitude change and a phase rotation in the output of the Fourier transform unit caused by a transmission channel;
   a region determining unit that determines a region on a complex plane in which output data after transmission channel equalization is present;
   a power calculating unit that receives the in-phase channels and the quadrature-phase channels after the transmission channel equalization as an input and calculates a power component of the reception signal; and
   a transmission-channel-fluctuation correcting unit that corrects
      an estimation value of a phase rotation angle output to the transmission-channel equalizing unit by the transmission-channel estimating unit based on a determination result of the region determining unit, and corrects
an estimation value of an amplitude fluctuation output to the transmission-channel equalization unit by the transmission-channel estimating unit based on a calculation result of the power calculating unit.

2. The radio receiving apparatus according to claim 1, further comprising a phase correcting unit that receives an output after the transmission channel equalization as an input and corrects phase fluctuation due to characteristics of a transmitter and a receiver.

3. The radio receiving apparatus according to claim 1, further comprising a phase correcting unit that receives an output after the transmission channel equalization as an input and corrects phase fluctuation due to characteristics of a transmitter and a receiver.

4. The radio receiving apparatus according to claim 1, wherein an amount of phase correction applied to the estimation value of the phase rotation angle by the transmission-channel-fluctuation correcting unit is set smaller according to an increase in a multi-value degree of a modulation method.

5. The radio receiving apparatus according to claim 1, wherein the region determining unit uses an output of the transmission-channel equalizing unit as the output data after the transmission channel equalization process is executed.

6. The radio receiving apparatus according to claim 2, wherein the region determining unit uses an output of the phase correcting unit as the output data after the transmission channel equalization process is executed.

7. The radio receiving apparatus according to claim 1, wherein the power calculating unit uses an output of the transmission-channel equalizing unit as the output data after the transmission channel equalization process is executed.

8. The radio receiving apparatus according to claim 2, wherein the power calculating unit uses an output of the phase correcting unit as the output data after the transmission channel equalization process is executed.

9. The radio receiving apparatus according to claim 1, wherein the region determining unit and the power calculating unit use an output of the transmission-channel equalizing unit as the output data after the transmission channel equalization process is executed.

10. The radio receiving apparatus according to claim 4, wherein the region determining unit uses an output of the phase correcting unit as the output data after the transmission channel equalization, and the power calculating unit uses an output of the transmission-channel equalizing unit as the output data after the transmission channel equalization.

11. The radio receiving apparatus according to claim 3, wherein the region determining unit uses an output of the transmission-channel equalizing unit as the output data after the transmission channel equalization, and the power calculating unit uses an output of the phase correcting unit as the output data after the transmission channel equalization.

12. The radio receiving apparatus according to claim 3, wherein the region determining unit and the power calculating unit use an output of the phase correcting unit as the output data after the transmission channel equalization.

13. The radio receiving apparatus according to claim 3, wherein the power calculating unit calculates a parameter, which is a ratio of a new transmission channel estimation value to an old transmission channel estimation value, and outputs the parameter to the transmission-channel-fluctuation correcting unit, and the transmission-channel-fluctuation correcting unit calculates a new transmission channel amplitude value by multiplying the calculated transmission channel amplitude value with the newly input parameter.

14. The radio receiving apparatus according to claim 3, wherein the region determining unit monitors a reception point on the complex plane in an output signal from the phase correcting unit for a predetermined time and determines that the reception point is present in a region 1 when an in-phase channel of the reception point is positive, a quadrature-phase channel thereof is positive, and an absolute value of the in-phase channel is larger than an absolute value of the quadrature-phase channel;
a region 2 when the in-phase channel of the reception point is positive, the quadrature-phase channel thereof is positive, and the absolute value of the in-phase channel is smaller than the absolute value of the quadrature-phase channel;
a region 3 when the in-phase channel of the reception point is negative, the quadrature-phase channel thereof is positive, and the absolute value of the in-phase channel is smaller than the absolute value of the quadrature-phase channel;
a region 4 when the in-phase channel of the reception point is negative, the quadrature-phase channel thereof is positive, and the absolute value of the in-phase channel is larger than the absolute value of the quadrature-phase channel;
a region 5 when the in-phase channel of the reception point is negative, the quadrature-phase channel thereof is negative, and the absolute value of the in-phase channel is larger than the absolute value of the quadrature-phase channel;
a region 6 when the in-phase channel of the reception point is negative, the quadrature-phase channel thereof is negative, and the absolute value of the in-phase channel is smaller than the absolute value of the quadrature-phase channel;
a region 7 when the in-phase channel of the reception point is positive, the quadrature-phase channel thereof is negative, and the absolute value of the in-phase channel is smaller than the absolute value of the quadrature-phase channel; and
a region 8 when the in-phase channel of the reception point is positive, the quadrature-phase channel thereof is negative, and the absolute value of the in-phase channel is larger than the absolute value of the quadrature-phase channel, and generates, when the regions 1, 3, 5, and 7 are represented as odd number regions and the regions 2, 4, 6, and 8 are represented as even number regions, region determination information obtained by determining whether a probability that the reception point is present in the odd number regions is large or a probability that the reception point is present in the even number regions is large and outputs the region determination information to the transmission-channel-fluctuation correcting unit.

15. The radio receiving apparatus according to claim 1, wherein the region determining unit monitors a reception point on the complex plane in an output signal from the phase correcting unit for a predetermined time and determines that the reception point is present in a region 1 when an in-phase channel of the reception point is positive, a quadrature-phase channel thereof is positive, and an absolute value of the in-phase channel is larger than an absolute value of the quadrature-phase channel;
a region 2 when the in-phase channel of the reception point is positive, the quadrature-phase channel thereof is positive, and the absolute value of the in-phase channel is smaller than the absolute value of the quadrature-phase channel;

a region 3 when the in-phase channel of the reception point is negative, the quadrature-phase channel thereof is positive, and the absolute value of the in-phase channel is smaller than the absolute value of the quadrature-phase channel;

a region 4 when the in-phase channel of the reception point is negative, the quadrature-phase channel thereof is positive, and the absolute value of the in-phase channel is larger than the absolute value of the quadrature-phase channel;

a region 5 when the in-phase channel of the reception point is negative, the quadrature-phase channel thereof is negative, and the absolute value of the in-phase channel is larger than the absolute value of the quadrature-phase channel;

a region 6 when the in-phase channel of the reception point is negative, the quadrature-phase channel thereof is negative, and the absolute value of the in-phase channel is smaller than the absolute value of the quadrature-phase channel;

a region 7 when the in-phase channel of the reception point is positive, the quadrature-phase channel thereof is negative, and the absolute value of the in-phase channel is smaller than the absolute value of the quadrature-phase channel; and a region 8 when the in-phase channel of the reception point is positive, the quadrature-phase channel thereof is negative, and the absolute value of the in-phase channel is larger than the absolute value of the quadrature-phase 32 channel, and generates, when the regions 1, 3, 5, and 7 are represented as odd number regions and the regions 2, 4, 6, and 8 are represented as even number regions, region determination information obtained by determining whether a probability that the reception point is present in the odd number regions is large or a probability that the reception point is present in the even number regions is large and outputs the region determination information to the transmission-channel-fluctuation correcting unit.

16. The radio receiving apparatus according to claim 4, wherein the region determining unit monitors a reception point on the complex plane in an output signal from the phase correcting unit for a predetermined time and determines that the reception point is present in a first quadrant when an in-phase channel of the reception point is positive and a quadrature-phase channel thereof is positive;

a second quadrant when the in-phase channel of the reception point is negative and the quadrature-phase channel thereof is positive;

a third quadrant when the in-phase channel of the reception point is negative and the quadrature-phase channel thereof is negative; and a fourth quadrant when the in-phase channel of the reception point is negative and the quadrature-phase channel thereof is negative, and generates region determination information obtained by determining whether a probability that the reception point is present in odd number quadrants is large or a probability that the reception point is present in even number quadrants is large and outputs the region determination information to the transmission-channel-fluctuation correcting unit.

17. The radio receiving apparatus according to claim 1, wherein the region determining unit monitors a reception point on the complex plane in an output signal from the phase correcting unit for a predetermined time and determines that the reception point is present in a first quadrant when an in-phase channel of the reception point is positive and a quadrature-phase channel thereof is positive;

a second quadrant when the in-phase channel of the reception point is negative and the quadrature-phase channel thereof is positive;

a third quadrant when the in-phase channel of the reception point is negative and the quadrature-phase channel thereof is negative; and a fourth quadrant when the in-phase channel of the reception point is negative and the quadrature-phase channel thereof is negative, and generates region determination information obtained by determining whether a probability that the reception point is present in odd number quadrants is large or a probability that the reception point is present in even number quadrants is large and outputs the region determination information to the transmission-channel-fluctuation correcting unit.

18. A radio receiving method for receiving a multi-carrier signal, comprising:

calculating in-phase channels and quadrature-phase channels of carrier waves from a reception signal obtained by receiving the multi-carrier signal;

calculating transmission channel characteristics of the carrier waves from a known signal section of the reception signal;

performing transmission channel equalization processing for compensating for an amplitude change and phase rotation in the in-phase channels and the quadraturephase channels caused by a transmission channel;

determining a region on a complex plane in which output data after transmission channel equalization is present;

receiving the in-phase channels and the quadraturephase channels in the output data after the transmission channel equalization as an input and calculating a power component of the reception signal;

correcting, based on information concerning the determined region, an estimation value of a phase rotation angle and an estimation value of amplitude fluctuation used in performing the transmission channel equalization processing; and correcting, based on information concerning the calculated power component, the estimation value of the amplitude fluctuation used in performing the transmission channel equalization processing.

\* \* \* \* \*